United States Patent [19]

Alexander et al.

[11] 4,450,854
[45] May 29, 1984

[54] LUBRICATED SPLIT PLUG VALVE

[75] Inventors: William H. Alexander; Joe R. Burger, both of Houston, Tex.

[73] Assignee: Vapor Corporation, Chicago, Ill.

[21] Appl. No.: 469,791

[22] Filed: Feb. 25, 1983
(Under 37 CFR 1.47)

Related U.S. Application Data

[63] Continuation-in-part of Ser. No. 215,728, Dec. 12, 1980, Pat. No. 4,393,893.

[51] Int. Cl.³ .............................................. F16K 5/22
[52] U.S. Cl. .......................... 137/246.12; 184/105 B; 251/309; 137/315
[58] Field of Search ............. 137/246, 246.12, 246.14, 137/246.15, 246.16, 246.22, 246.23; 184/105 B; 251/289, 309, 310, 311

[56] References Cited

U.S. PATENT DOCUMENTS 2,269,887 1/1942 Sharp .................................... 251/93
4,393,893 7/1983 Alexander ...................... 137/246.12

OTHER PUBLICATIONS

Service Manual for Mission Non-Wedging, Split Cylindrical Core Valve.

Primary Examiner—George L. Walton
Attorney, Agent, or Firm—Francis J. Lidd

[57] ABSTRACT

A lubricated split plug valve includes a valve body defining a chamber with fluid ports therethrough. A valve stem is rotatably mounted in the body and engages a split cylindrical valve member. The valve member includes a cylindrical passage with first and second inlets. The valve member includes a pair of core halves defined along an oblique plane passing through the cylindrical passage. Identical grooves for conveying sealant/lubricant to the plug/body interface are fabricated on the outer peripheral surfaces of the core halves with portions that substantially surround one of the passage inlets defined in the particular core half. Each groove also includes a continuous portion encircling the remaining outer periphery of each core half. Each groove is in fluid communication with a reservoir wherein lubricant may be introduced from a source into the groove. A piston is in each reservoir and biased under the influence of line pressure and gravity forces. A first alternate plug valve member includes a peripheral groove that is semicircular with one arm or extension beneath the passage inlets cooperating with body grooves to introduce sealant/lubricant at the interface.

4 Claims, 9 Drawing Figures

FIG. 8
VALVE CLOSED

VALVE OPEN
FIG. 9

LUBRICATED SPLIT PLUG VALVE

CROSS REFERENCE TO RELATED APPLICATIONS

This application is a continuation-in-part of application Ser. No. 215,728, filed Dec. 12, 1980, now Pat. No. 4,393,893. That application and any amendments thereto are hereby incorporated by reference.

BACKGROUND OF THE INVENTION

1. Field of the Invention

The present invention relates to a new and improved lubricated split plug valve that may be used on high pressure fluid lines to control the flow therethrough.

2. Description of the Prior Art

Prior art lubricated plug valves are used in heating and other treating units, gathering systems, recycling and gasoline plants, blow out preventers and other applications wherein control of the flow of high pressure working fluid at pressures as high as 3,000 to 6,000 psig is required. An example of such a typical prior art valve is illustrated in U.S. Pat. No. 2,269,887, and this patent is incorporated by reference herein. Prior art valves of the type employed in systems wherein substantial pressures are controlled use valve plugs that tend to be forced against the downstream seal in the valve body resulting in the plug valve being virtually impossible to open without injecting a lubricant or sealant.

One approach to overcoming this problem in the prior art is illustrated in the above mentioned U.S. Pat. No. 2,269,887. This valve utilizes mating lubricating seal grooves fabricated in both the outer peripheral surface of the valve plug and the inner peripheral surface of the valve body. In this way, overlapping communicating grooves completely encircle the downstream port in the closed position thereby allowing access of lubrication and reducing the torque to close the valve.

These typical prior art valves, however, require correct alignment of a groove on the outer peripheral surface of the valve plug and a groove defined on the inner peripheral surface of the valve body and continuous flow of lubricant from the first groove to the second groove to ensure the desired complete lubrication. This alignment occurs only in the closed position of the plug. Due to the pressures forcing the lubricant through these grooves and the difficulty of alignment of the grooves there is a substantial pressure drop resulting in incomplete lubrication.

Prior art valves of this type have not contemplated utilizing an injected sealant and lubricant in existing designs. Therefore, location of sealant/lubricant carrying grooves adjacent product flow ports in both the valve body and plug have only been used to break an existing seal in either the open or closed position. The construction disclosed in this application provides contemporaneous lubrication and sealing.

SUMMARY OF THE INVENTION

An object of the present invention is to provide a new and improved lubricated valve for use in high pressure pipelines and the like.

Another object of the present invention is to provide a new and improved split plug valve for use in a valve controlling high pressure fluid flow wherein the plug is split along an oblique plane to establish better lubrication around the plug flow port.

An additional object of the invention is to provide a split plug valve having a lubricant/sealant construction wherein normal valve operation does not subject the sealant grooves to washout by the flowing product.

A further object of the present invention is to provide a new and improved valve for high pressure lines employing a split plug valve element that provides sealant and lubrication system through the use of grooves defined on the split plug valve element and valve body wherein lubricant/sealant washout can be introduced at the plug-body interface for both open and closed positions of the valve.

A still further object of the present invention is to provide a new and improved valve employed in high pressure lines that includes a lubricated split plug valve wherein lubrication and plug/valve body sealing is maintained by line pressure.

The present invention is directed to a new and improved lubricated type valve that may be employed in high pressure fluid lines such as heaters or other treating units, gathering systems, and recycling and gasoline plants. These valves are typically employed in fluid lines with a working pressure in the range of 3,000–6,000 psig. The valve of the present invention includes a valve housing with first and second ports adaptable to be connected to a high pressure fluid line. A chamber is defined within the valve housing and a cylindrical split plug valve member is rotatably mounted within the chamber. A valve stem is rotatably mounted in the valve body and connected to the cylindrical valve plug member to allow rotation thereof.

The split cylindrical plug or core valve member includes a cylindrical passage with first and second inlets at opposite ends thereof. The plug valve member includes first and second plug halves defined along an oblique plane through the cylindrical passage. In this manner, the first valve plug half includes a majority of the first inlet and a minority of the second inlet and the second valve plug half includes the majority of the second inlet and a minority of the first inlet. In this manner, grooves may be fabricated on the outer peripheral surface of each of the first and second plug halves surrounding the majority of the first inlet on the first plug half and the majority of the second inlet on the second plug half. The grooves are identical on each plug half and each communicates with a port extending into each plug half from a lubricant reservoir. A plunger is mounted within each reservoir and is exposed to line pressure below and to the lubricant above such that line pressure moves the plunger to force lubricant into the grooves to provide the desired lubrication.

BRIEF DESCRIPTION OF THE DRAWINGS

The above and other objects and advantages and novel features of the present invention will become apparent from the following detailed description of the preferred embodiment of the invention illustrated in the accompanying drawings wherein.

DESCRIPTION OF THE PREFFERRED EMBODIMENT

Figure 3:
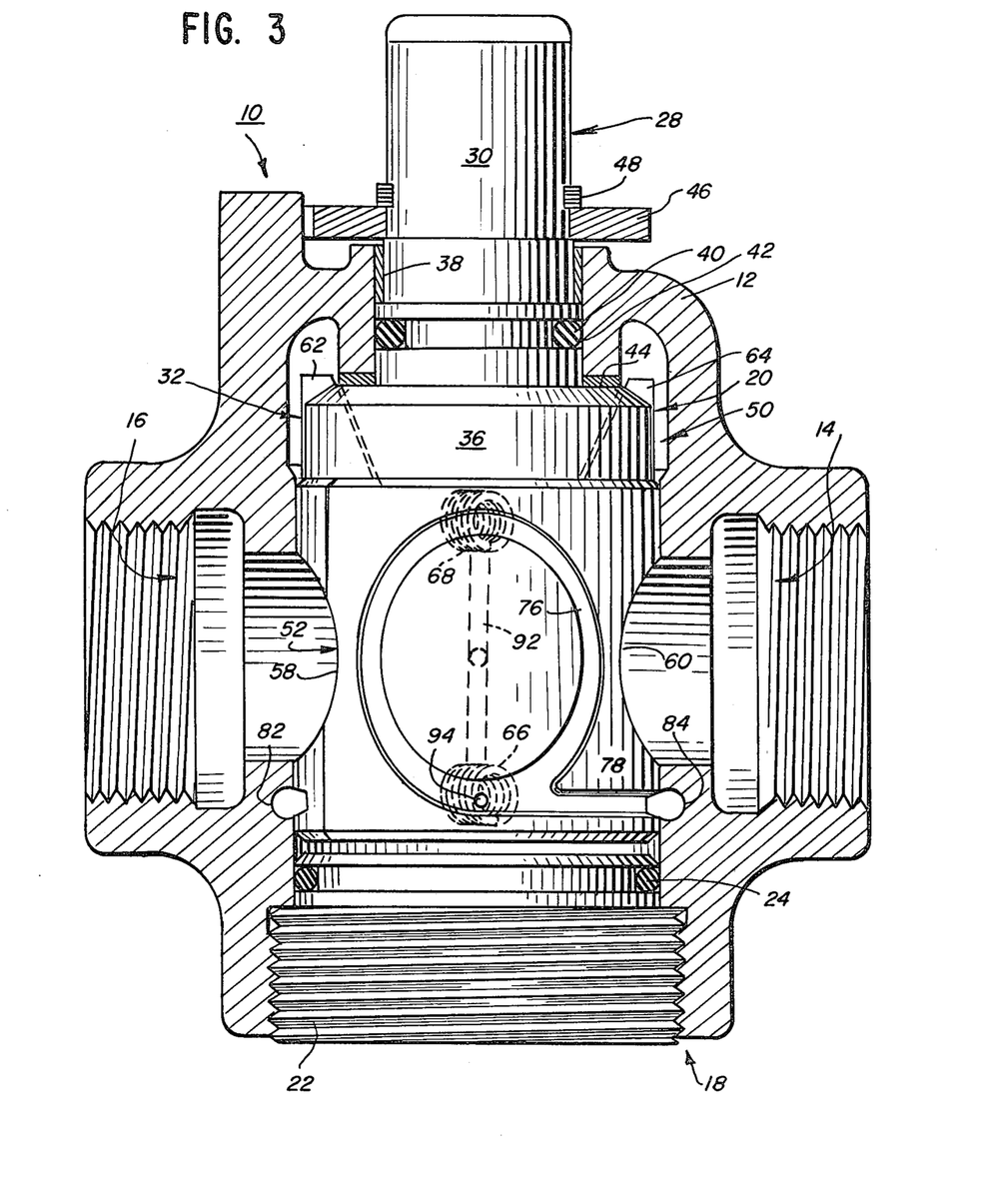
FIG. 3 is a vertical, cross-sectional view of the valve constructed in accordance with the principles of the present invention in the open position.
Figure 4:
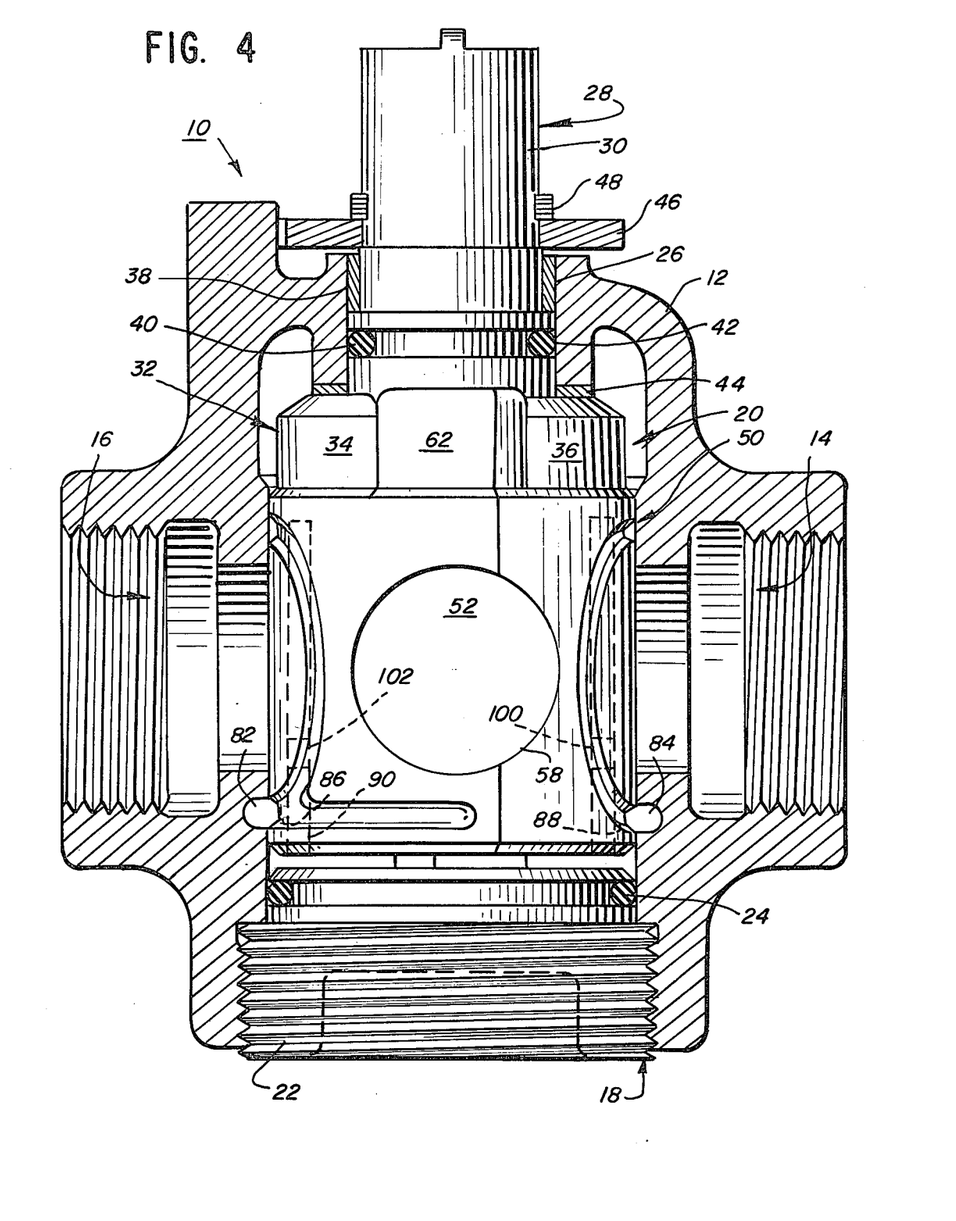
FIG. 4 is a view similar to FIG. 3 of the valve in the closed position.

With reference to FIGS. 3, and 4, there is illustrated a lubricated split plug valve generally designated by the reference numeral 10. The valve 10 may be employed in a high pressure line with working fluid typically in the range of 3,000 to 6,000 psig to control flow therethrough. Due to the high pressures in the pipeline to which the valve 10 is connected, the valve is subjected to substantial downstream pressures resulting in difficult operation. To overcome this problem, the valve 10 includes a lubricating system to allow ease of operation of the valve under high pressure conditions.

The valve 10 includes a valve housing or body 12 with first 14 and second 16 threaded apertures or ports that are adapted to be threadably connected to a fluid pipeline the flow through which the valve 10 is intended to control. The valve 10 also includes an opening 18 to allow access to an interior chamber generally designated by the reference numeral 20 defined within the valve body 12. The opening 18 is closed or covered by a threaded cover 22 that includes a cover seal or O-ring 24 to ensure against leakage.

Figure 1:
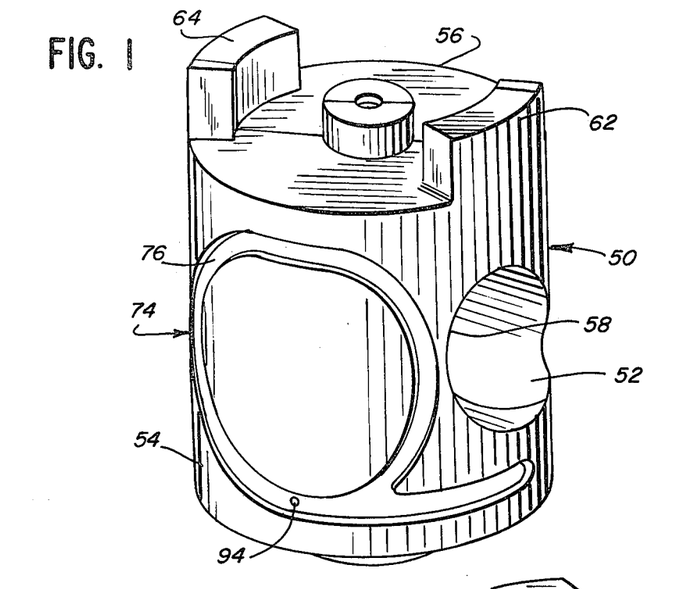
FIG. 1 is a perspective view of the split plug valve member constructed in accordance with the principles of the present invention.

The body 12 further includes an aperture or opening 26 opposite the opening 18 that communicates with the chamber 20 and allows for the positioning of a stem generally designated by the reference numeral 28. The stem 28 includes an elongated portion or handle 30 that extends out of the opening 26 and may be engagable by a tool or wheel to allow rotation of the stem 28 relative to the body 12. The stem 28 includes opposite the portion 30 a bifurcated end 32 with engagement members 34 and 36 spaced from each other a distance approximately the diameter of the elongated portion 30. To allow rotation of the stem 28 in the opening 26, a stem bearing 38 is positioned around the portion 30 within the opening 26 and an O-ring or stem seal 40 is located in a groove 42 defined in the stem 28 to prevent flow therearound during rotation. To also assist the rotation of the stem 28 a stem thrust bearing 44 is located between the upper surfaces of the engagement members 34, 36, and the housing 12. The stem 28 is held in position with the various components described by a stop collar 46 and a stop collar snap ring 48 located above the opening 26 and the housing of the body 12. The assembly described provides a securely held stem 28 that may be rotated within the body 12 without leakage therearound The engagement portions 34 and 36 of the stem 28 are intended to engage a cylindrical split plug valve member generally designated by the reference numeral 50. The function of the cylindrical split plug valve member 50 is to control fluid flow through the valve 10 from one of the ports 14 and 16 through the chamber 20 to the other of the ports 14 and 16. As best illustrated in the FIGS. 1 and 2, the cylindrical split plug valve element 50 includes a cylindrical bore therethrough 52. In the preferred embodiment illustrated, the cylindrical bore 52 extends along a diameter of the split plug valve element 50. In accordance with an important feature of the present invention, the split plug valve element 50 is bisected along a plane passing obliquely through the valve element 50 and the cylindrical bore or passage 52. For example, the oblique plane may be at a 15°–45° angle to the diameter of valve element 50 along which the cylindrical passage or bore 52 lies. By cutting or bisecting the split plug valve element 50 in this manner, two valve plug halves 54 and 56 are defined.

Figure 2:
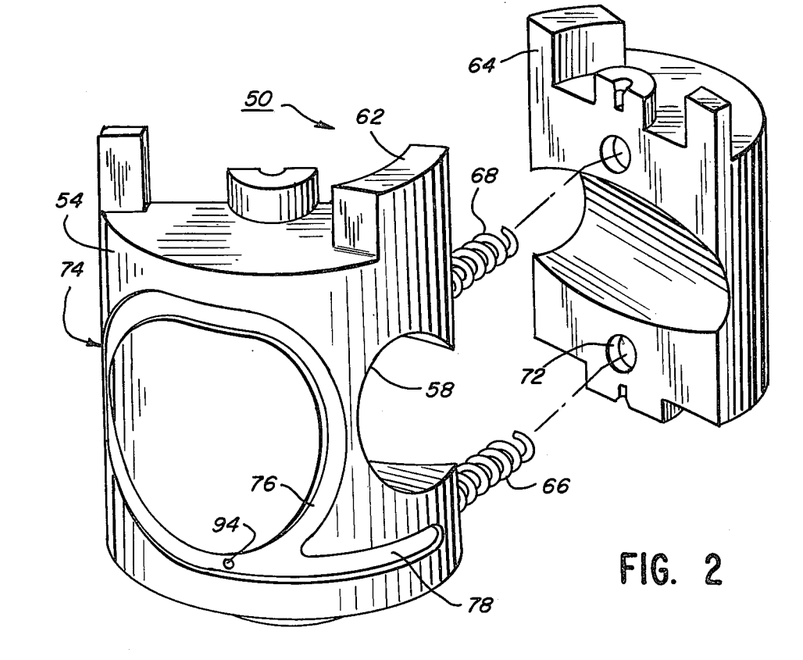
FIG. 2 is a view similar to FIG. 1 illustrating the component valve plug halves of the split plug valve member illustrated in FIG. 1.

As best illustrated in FIG. 2, the plug half 54 includes a major portion of a first inlet 58 to the passage 52 and a minor portion of a second inlet 60 of the cylindrical passage 52. Conversely, the plug half 56 includes a minor portion of the inlet 58 and a major portion of the second inlet 60. By this construction as will be described hereinafter, lubrication grooves can be fabricated in the plug halves 54 and 56 that substantially surround the periphery of the inlets 58 and 60 thus allowing the desired amount of lubrication around the entire periphery of the inlets 58 and 60 without the necessity of passages being fabricated in the inner peripheral surface of the valve body 12 as is typical in the prior art.

The core halves 54 and 56 each include an integral lug 62 and 64, respectively. The lugs 62 and 64 are engaged by the engagement members 34 and 36 (FIGS. 3 and 4) and provide a mechanical connection to the stem 28 thereby allowing rotation of the stem 28 to impart rotation to the valve element 50. To ensure a seal of the outer peripheral surface of the valve element 50 with the inner peripheral surface of the housing 20, springs 66 and 68 are mounted in identical apertures 70 and 72 defined in the plug halves 54 and 56 and function to bias the plug halves 54 and 56 away from each other and into engagement with the inner peripheral surface of the chamber 20 ensuring a seal even when line pressure is low in the system to which the valve 10 is connected.

As previously described, rotation of the valve element 50 can be difficult due to the high pressures of the working fluid passing through the valve 10. Accordingly, a lubricating sealing system is desired in order to allow rotation of the valve element 50 through the employment of the stem 28. The plug or core halves 54 and 56 include identical grooves generally designated by the reference numeral 74 on the outer peripheral surfaces thereof. Each groove 74 includes a substantially continuous or circular portion 76 defined in the area of the core halves 54 and 56 spaced slightly from the inlets 58 and 60 of the cylindrical passage 52. In addition, the grooves 74 includes arm portions 78 and 80 extending from the continuous or circular groove 76 outwardly and substantially surrounding the upper and lower edges of the inlets 58 and 60.

As best seen in FIG. 2 and with specific regard to the core half 54, the major portion of the inlet 58 is surrounded by the arm portions 78 and 80 and a portion of the circular portion 76 of the groove 74. As also seen in FIG. 2 with regard to core half 56, the minor portion of the inlet 58 is adjacent the continuous groove 76. Thus, substantially the entire periphery of the inlets 58 and 60 are substantially surrounded by portions of the grooves 74 and a mating groove in the valve body 12 is not required.

Lubricant is provided to the grooves 74 from an external source such as a lubricating gun that may be attached to a fitting (not shown) defined on the housing 12. The fitting is in fluid communication with passages 82 and 84 defined in the valve body 12 (FIGS. 3 and 4). The passages 82 and 84 are in fluid communication through passages 86 and 88, respectively, defined in the core halves 54 and 56. The reservoirs 90 and 92 are in fluid communication at a lower end thereof with the grooves 74 through identical apertures 94 illustrated in FIG. 2 on core 54. A similar aperture is also included in the groove 74 in the core half 56. The reservoirs 90 and 92 also include plungers 100 and 102 mounted within the reservoirs 90 and 92 at a location above the apertures 94.

Accordingly, to lubricate the grooves 74, lubricant is introduced into the passages 82 and 84 and if the valve element 50 is in the closed position, the passages 82 and 84 and the passages 86 and 88 are aligned with the apertures 94. Lubricant is then forced into the groove 74 and through the apertures 94 into the reservoirs 90 and 92 below the piston plungers 100 and 102.

In the open position of the valve 10, the passages 82 and 84 are aligned with the grooves 74 at points spaced from the apertures 94. Thus, lubricant is forced directly into the groove 74 and after passing along the grooves 74 into the apertures 94, passes into the reservoirs 90 and 92.

Lubricant is forced out of the reservoirs 90 and 92 under the influence of the plungers 100 and 102 as lubricant in the groove 74 is washed away or flows away. The plungers 100 and 102 are forced downwardly in the reservoirs 90 and 92 under the influence of the stream pressure passing through the apertures 96 and 98. Also, due to the location of the groove 74 on the core halves 54 and 56, lubricant/sealant can be injected between the valve plug and body for both open and closed positions of the valve.

Figure 5:
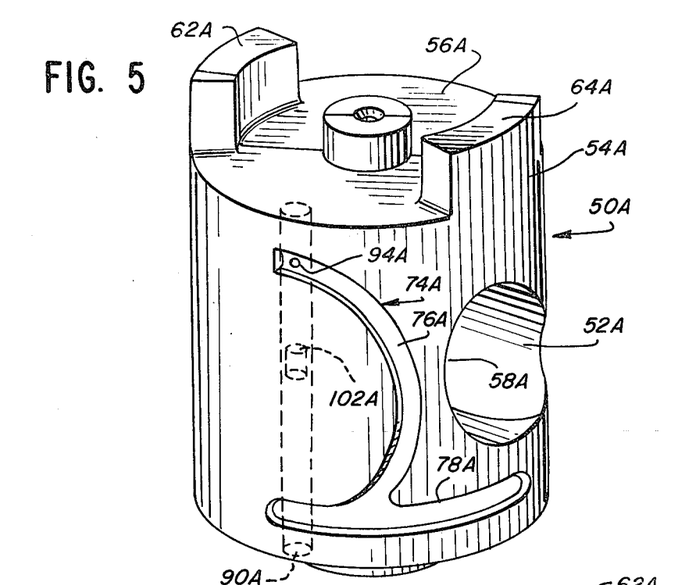
FIG. 5 is a perspective view of an alternate plug construction particularly showing the plug lubricating system.
Figure 6:
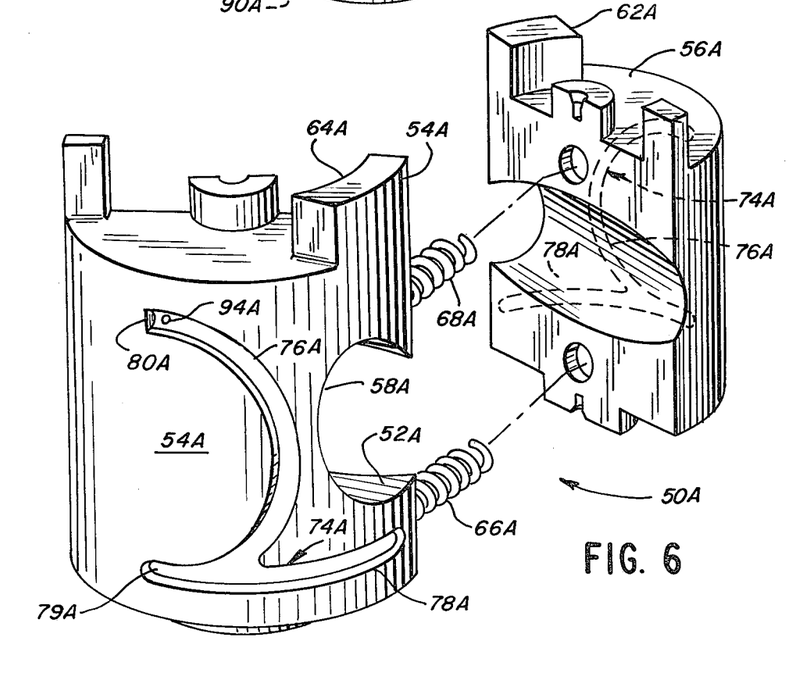
FIG. 6 is an exploded view of the alternative plug particularly showing location of the lubricating/sealant grooves.
Figure 7:
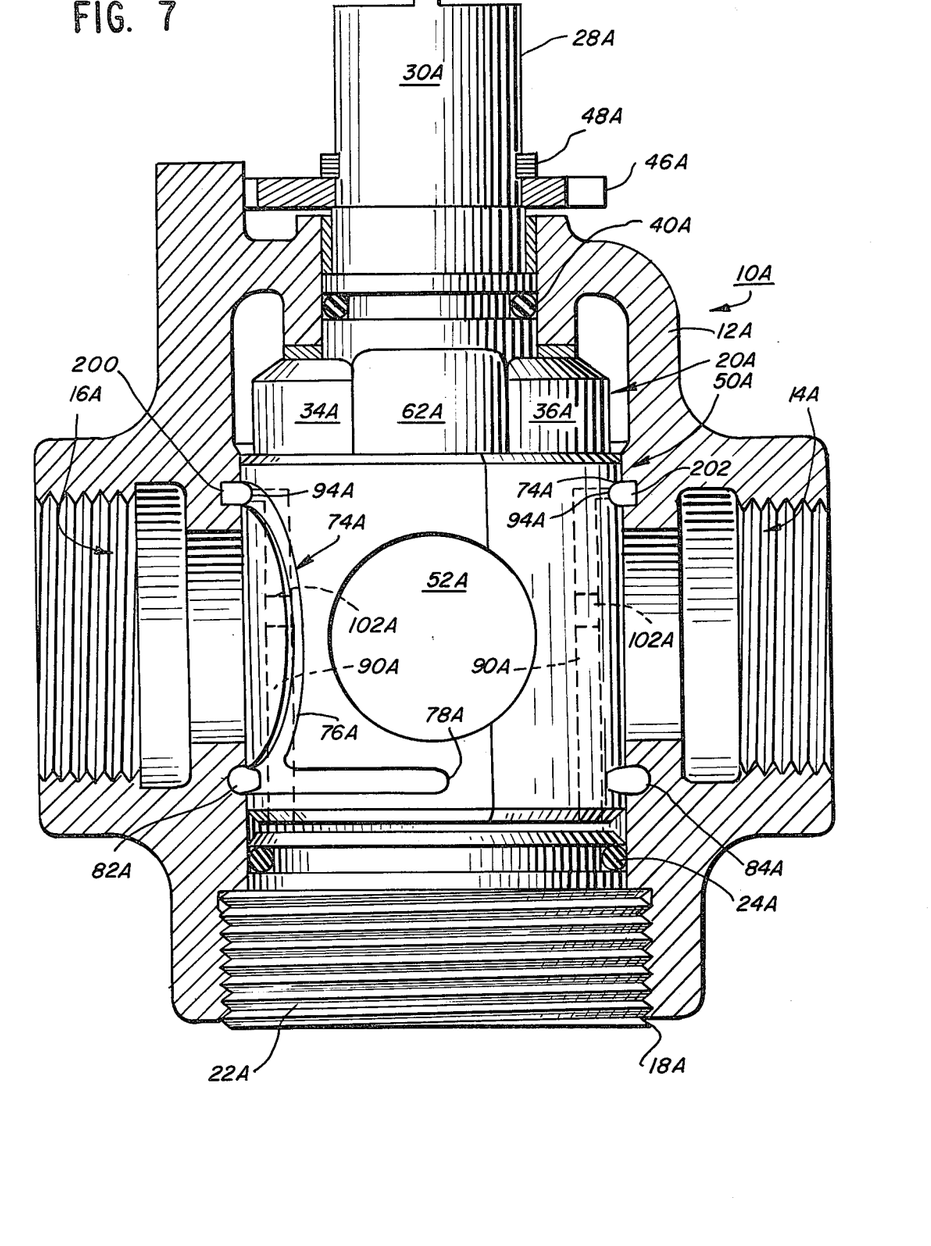
FIG. 7 is a view of an alternative valve including the alternative plug.

Referring to FIGS. 5–7, there is illustrated an alternative split plug valve 50A that differs from the split plug valve 50 illustrated in FIGS. 1–4 primarily by the configuration of the grooves 74A in the peripheral surface of the plug 50A. In discussing the alternative plug valve 50A components identical to those of the plug valve 50 will be designated by the same reference numeral employed in FIGS. 1–4 but with the suffix "A".

It has been discovered that in valves of certain sizes, for example, valves of a diameter greater than two inches, at certain pressures sufficient force is generated that will wash out the lubricant sealing compound from the grooves and rapidly delete the supply of lubricant in the reservoir, such as the groove 74 and the reservoir 90 in the valve plug 50. It has also been determined that the groove structure 74 and location of apertures 94 in the plug 50 allow injected lubricant to flow directly into the reservoir input passages 86 and 88 rather than distribute evenly within the groove 74. The alternative plug valves 50A (FIG. 5, FIG. 6, and FIG. 7,) differ from the plug valve 50 (FIG. 1) in the groove 74A design. The valve plugs 50A other than the configuration of the grooves 74A and location of the plug apertures 94 are substantially similar to the plug valve 50 of FIGS. 1–4 and for this reason only the configurations of the grooves 74A will be described.

Referring initially to the grooves 74A (FIG. 5,) identical grooves 74A appear on the outer peripheral surfaces of both core halves 54A and 56A. Each groove 74A includes a substantially continuous semicircular portion 76A slightly spaced from the inlets 58A and 60A of the circular passage 52A. In addition, the groove 74A includes an arm or tail 78A that extends outwardly from the continuous or semicircular grooved portion 76A and below the inlet 58A, thereby substantially surrounding on the sides and the bottom portion thereof of the inlets 58A and 60A.

Figure 8:
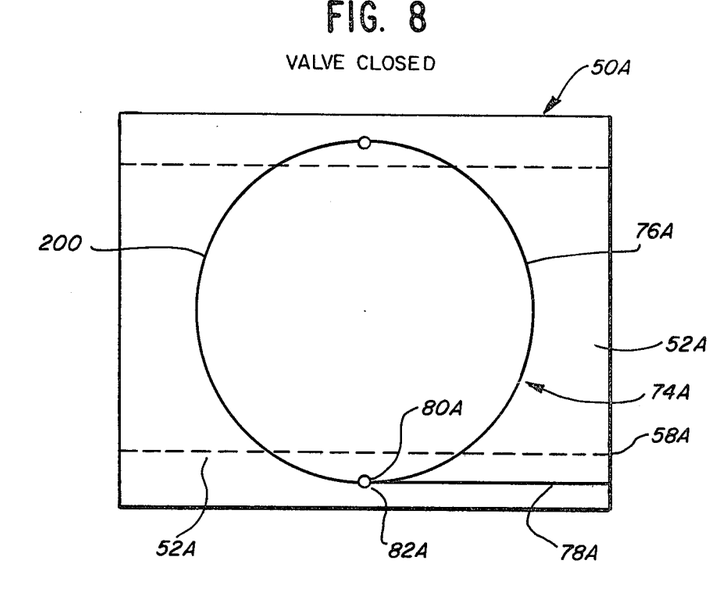
FIGS. 8 and 9 are diagrammatic representations showing the sealant/lubrication system of the alternate embodiment of FIGS. 5, 6, and 7, as viewed from port 16.
Figure 9:
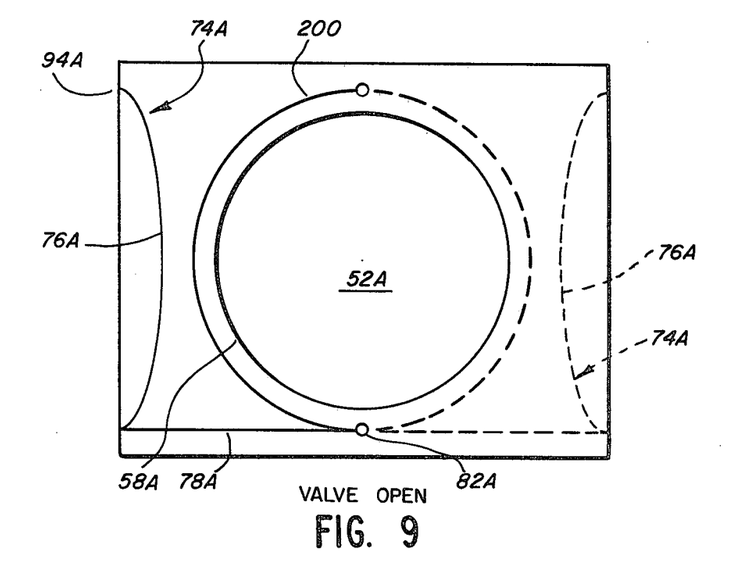

The rounded corners of the grooves 76A and 76B in comparison to the angular corners of the grooves 76 allow better flow thereby enhancing the sealing and lubricating effect of the lubricant in the grooves 76A and 76B. The tails 78A of grooves 74A also serve the function of maintaining communication with the lubricant inlets 82A and 84A (ref. FIG. 7) in the valve open position as well as the valve closed position, thereby ensuring constant communication with lubrication. The valve plug 50A is illustrated as positioned within the valve 10A in FIG. 7. The valve 10A is substantially the same as the valve 10 illustrated in FIGS. 3 and 4 with the exception of semicircular grooves 200 and 202 that cooperate with the semicircular grooves 74A in the valve closed position (ref. FIGS. 8 and 9.) The grooves 200 and 202 are fabricated in the inner peripheral surface of the valve 10A and are semicircular in configuration, in partial and complimentary encirclement of the valve ports 14A, and 16A, to ensure that the grooves 74A are lubricated in both the valve open and closed positions.

In operation (ref. FIGS. 8, and 9,) with the valve plug positioned in the closed position (ref. FIG. 7) lubricant/sealant enters at 82A, follows the groove 74A via elements 76A and 78A. As groove ends 79A and 80A also communicate with body grooves 200 and 202, lubricant/sealant surrounds port 52A at each end. Sealant/lubricant injection via inlets 82A and 84A also fills reservoirs 90A through port 94A, forcing plunger 102A downward. As the lower end of reservoir 90A, is in fluid communication with the controlled product, pressurized product acting on plunger 102A provides continuous lubrication during valve operation.

With the valve plug 50A in the open position, grooves 74A remain in fluid communication with ports 82A via the tail portion 78A, and body grooves 200 and 202 communicate with groove portion 78A via ports 80A in each plug half. As shown in FIGS. 8, and 9, the system provides means for injecting sealant/lubricant to the plug/valve body for both plug positions.

The grooves 200 and 202 are also in communication with the lubricant inlets 82A and 84A thereby ensuring the placement of lubricant within the grooves 200 and 202.

What is claimed and desired to be secured by Letters Patent of the United States is:

1. In a fluid control valve of the type having a plug closure member rotatable between open and closed positions for controlling pressurized product flow therethrough by alignment of apertures in the valve body and ports on the closure member and a passage therethrough, a lubrication system comprising;
    first and second plug halves defined along a plane intersecting said plug at an angle oblique to the longitudinal axis of said plug passage, each said half containing a major portion of one plug inlet, and a minor portion of the other plug inlet, respectively;

a semi-circular groove on each plug half outer surface, having a first leg peripherally displaced from the bottom portion of the semi-circular groove and a second leg extending under said major inlet portion which is connected to the first leg;

a continuous groove in said body adjacent to and essentially surrounding a portion of each body aperture, and including a portion in fluid communication with said semi-circular groove first and second leg;

ports in said body and said semi-circular groove for communicating said body and said semi-circular groove for admitting sealant/lubricant therethrough;

wherein pressurized sealant introduced via said sealant ports enters said body and said semi-circular groove in both the open and closed valve positions.

2. The valve claimed in claim 1 further comprising a sealant lubricant reservoir defined in each plug half; and
means fluid communicating each said reservoir with said semi-circular groove.

3. The valve claimed in claim 2 further comprising a plunger in each reservoir; and
means communicating product pressure below said plunger;
wherein sealant/lubricant enters said reservoirs above said plunger providing continuous lubrication/sealing on introduction of pressurized product.

4. The valve claimed in claim 1 wherein said oblique angle is 15° to 28°.

* * * * *